United States Patent [19]

(12) United States Patent
Nainar et al.

(10) Patent No.: US 10,880,203 B2
(45) Date of Patent: Dec. 29, 2020

(54) CENTRALIZED SEGMENT ROUTING DATAPLANE BASED BACKUP PATH VALIDATION

(71) Applicant: Cisco Technology, Inc., San Jose, CA (US)

(72) Inventors: Nagendra Kumar Nainar, Morrisville, NC (US); Carlos M. Pignataro, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/619,851

(22) Filed: Jun. 12, 2017

(65) Prior Publication Data

US 2018/0359176 A1 Dec. 13, 2018

(51) Int. Cl.
*H04L 12/707* (2013.01)
*H04L 12/703* (2013.01)
*H04L 12/721* (2013.01)
*H04L 29/14* (2006.01)

(52) U.S. Cl.
CPC .............. *H04L 45/22* (2013.01); *H04L 45/28* (2013.01); *H04L 45/34* (2013.01); *H04L 45/123* (2013.01); *H04L 69/40* (2013.01)

(58) Field of Classification Search
None
See application file for complete search history.

(56) References Cited

U.S. PATENT DOCUMENTS

| | | | | |
|---|---|---|---|---|
| 8,964,570 B2* | 2/2015 | Kumar | ..................... | H04L 45/00 370/242 |
| 9,369,371 B2 | 6/2016 | Filsfils et al. | | |
| 9,537,712 B2 | 1/2017 | Nainar et al. | | |
| 9,838,246 B1* | 12/2017 | Hegde | ................. | H04L 41/0668 |
| 10,044,603 B1* | 8/2018 | Singh | ..................... | H04L 45/22 |

(Continued)

OTHER PUBLICATIONS

"Segment Routing Traffic Engineering", Segment Routing Configuration Guide, Apr. 17, 2017, 22 pages.

(Continued)

*Primary Examiner* — Alex Skripnikov
*Assistant Examiner* — Sharmin Chowdhury
(74) *Attorney, Agent, or Firm* — Edell, Shapiro & Finnan, LLC (57) ABSTRACT

In one embodiment, a server has connectivity to a network that includes a plurality of nodes. The server stores a context identifier that is associated with backup path information stored at a particular node of the plurality of nodes, the backup path information indicating a backup path in the network. The server sends to the particular node a probe packet having a data plane instruction label that includes an identifier of the particular node, the context identifier and server identifier information. The context identifier in the probe packet causes the particular node to retrieve the backup path information and send the probe packet to a next hop node in the backup path based on the backup path information. The server determines whether the probe packet is received at the server after traversing the backup path, and validates the backup path for the particular node accordingly.

20 Claims, 9 Drawing Sheets

(56) References Cited

U.S. PATENT DOCUMENTS

| | | | | |
|---|---|---|---|---|
| 2011/0310727 | A1* | 12/2011 | Guo | H04L 41/0677 |
| | | | | 370/216 |
| 2014/0269266 | A1 | 9/2014 | Filsfils et al. | |
| 2015/0304206 | A1* | 10/2015 | Filsfils | H04L 45/04 |
| | | | | 709/238 |
| 2015/0381444 | A1* | 12/2015 | Nainar | H04L 43/0811 |
| | | | | 370/241.1 |
| 2017/0093611 | A1* | 3/2017 | Arora | H04L 41/0654 |

OTHER PUBLICATIONS

C. Filsfils, et al., "Segment Routing Architecture", draft-ietf-spring-segment-routing-11, Network Working Group, Internet-Draft, Feb. 16, 2017, 28 pages.

R. Geib, et al., "A Scalable and Topology-Aware MPLS Dataplane Monitoring System", draft-ietf-spring-oam-usecase-06, spring, Internet-Draft, Feb. 21, 2017, 16 pages.

Alcatel-Lucent ,"Alcatel-Lucent 5620", Service Aware Manager, Release 13.0 R3, Alarm Reference, 3HE-09797-AAAC-TQZZA, Issue 1.0, Jun. 2015, 4570 pages.

Alcatel-Lucent, "26—MPLS", Alcatel-Lucent 5620 SAM Release 13.0 R3 I 5650 CPAM Release 9.0 R3, https://infocenter.nokia.com/public/5620SAM130R3A/index.jsp?topic=%2FSAM_UG%2Fhtml%2Fsam_network_mpls.html, 2015, 37 pages.

\* cited by examiner

CENTRALIZED SEGMENT ROUTING DATAPLANE BASED BACKUP PATH VALIDATION

TECHNICAL FIELD

The present disclosure relates to backup path validation in label-based routing networks.

BACKGROUND

Segment Routing is applicable in both Multi-Protocol Label Switching (MPLS) and Internet Protocol version 6 (IPv6) data planes. While Fast Re-routing (FRR) helps redirect any link/node failure, a determination is to be made that the backup path is functioning properly. Path validation is an important operational criteria to ensure network uptime and service level agreement (SLA) guarantees.

DESCRIPTION OF EXAMPLE EMBODIMENTS

Overview

In one embodiment, a server has connectivity to a network that includes a plurality of nodes. The server stores a context identifier that is associated with backup path information stored at a particular node of the plurality of nodes, the backup path information indicating a backup path in the network from the particular node. The server sends to the particular node a probe packet having a data plane instruction label (e.g., labels in a label stack or segment list in a Segment Routing header), that includes an identifier of the particular node, the context identifier and server identifier information. The context identifier in the probe packet causes the particular node to retrieve the backup path information and send the probe packet to a next hop node in the backup path based on the backup path information. The server determines whether the probe packet is received at the server after traversing the backup path. The server then validates the backup path for the particular node based on whether the probe packet is received at the server.

In another embodiment, a node is provided in a network that includes a plurality of nodes. The node computes a backup path in the network, and stores backup path information describing the backup path in a backup context table. The node assigns a context identifier for the backup context table, and adds an entry for the context identifier to forwarding information maintained at the node. The node advertises the context identifier in the network, including to a server that manages the plurality of nodes in the network.

Example Embodiments

The IETF document, draft-ietf-spring-oam-usecase, introduces the concept of centralized Operations, Administration, and Maintenance (OAM) path validation. The techniques defined in the draft are useful to validate a primary Segment Routing (SR) path.

Presented herein are techniques to extend path validation to backup path validation by leveraging the benefits of data plane-based path validation, that is, no control plane intervention on any transit nodes.

A domain wide unique label is assigned from a Segment Routing Global Block (SRGB) as a Backup Context Segment Identifier (BC-SID) on all nodes. The SRGB is a range of labels reserved for Segment Routing Global Segments. The default SRGB is 16,000-23,999. A prefix-Segment Identifier (SID) is advertised as a domain-wide unique index. The Prefix-SID index points to a unique label within the SRGB. The index is zero based, i.e. first index=0– Label=Prefix-SID index+SRGB base. For example, when the SRGB is 16000, the prefix 1.1.1.65/32 with Prefix-SID index 65 gets label 16065. Similarly, if the SRGB is 18000, the Prefix-SID will be 18065.

When any network element (node) computes a backup path for link/node protection, the network element creates a Backup Context Table (BC-Table) and populates the entries with backup forwarding details (describing the backup path) in this new context table. A Backup Context-SID (BC-SID) is used as context identifier to identify this table. Again, each node within an SR domain is assigned a domain wide unique segment from the SRGB as a BC-SID.

The primary path entry is marked with primary adjacency and the backup adjacency (in case of primary link failure) points towards the context in the BC-SID. When any node receives a packet with a top segment as the BC-SID, the node will perform a lookup in the BC-Table.

A centralized Operations, Administration and Management (OAM) server sends a probe packet with a data plane instruction label (e.g., stack of labels) as <PLR><BC-SID><P-SID><Server-SID> where:

PLR->Segment ID to reach the Point of Local Repair (PLR), in other words, the Segment ID to reach the PLR for the backup path. The PLR is the node that has the backup path information.

BC-SID->Backup Context SID advertised by the PLR to the OAM server.

P-SID->Prefix SID for which the backup path should be validated.

Server-SID->Segment ID to reach the OAM Server.

Thus, the probe packet will include the context label (BC-SID) and the label of the path to be validated, i.e., the P-SID.

Figure 1:
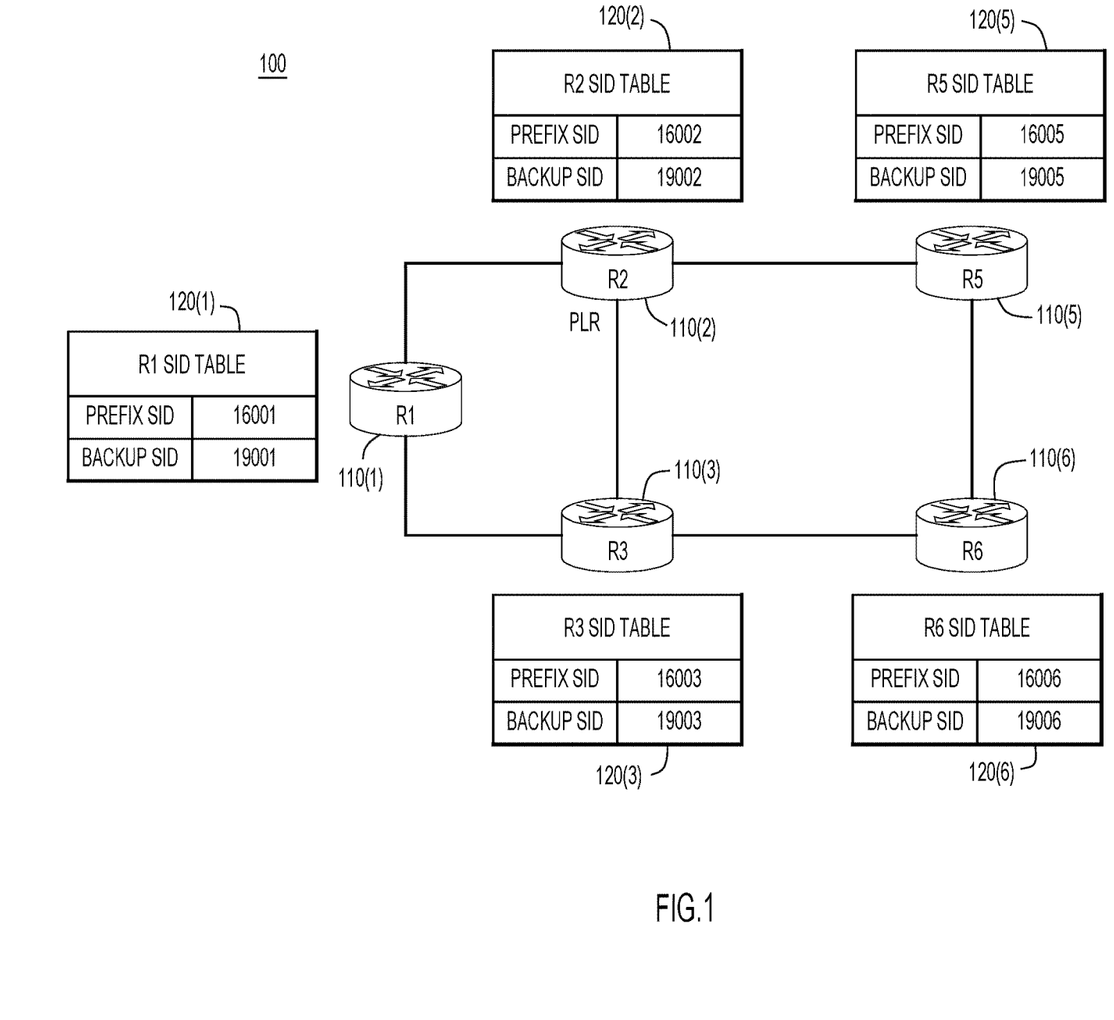
FIG. 1 is diagram of a network topology in which the data plane-based backup path validation techniques presented herein may be employed, according to an example embodiment.

Reference is now made to FIG. 1 for a description of an example. FIG. 1 shows a network topology 100 that includes nodes (routers) R1, R2, R3, R5 and R6 at reference numerals 110(1). 110(1), 110(2), 110(3), 110(5) and 110(6), respectively. R2 is the PLR in this example. In this topology, 1600x is the Prefix SID for Rx and 1900x is the BC-SID for Rx. In order words, for R1: the Prefix-SID is 16001 and the BC-SID is 19001, for R2: the Prefix-SID is 16002 and the BC-SID is 19002, and so on. This is the information configured in the SID tables 120(1), 120(2), 120(3), 120(5) and 120(6) for R1, R2, R3, R5 and R6. When computing the primary path, each node identifies the egress interface and programs the forwarding table with relevant primary pointers (rewrite information and egress information).

Figure 2:
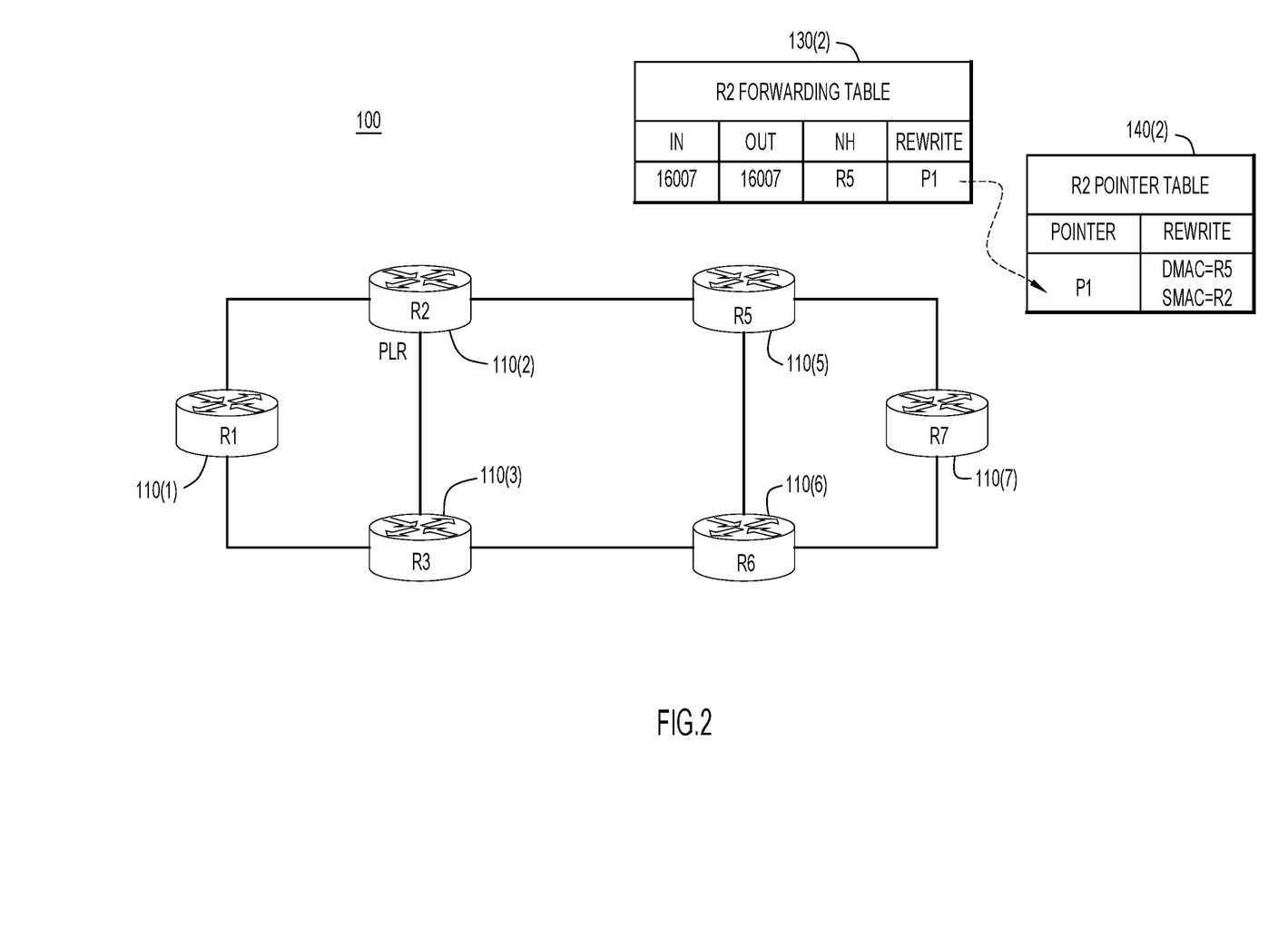
FIG. 2 is a diagram similar to FIG. 1, and showing how a packet is routed in the network based on information stored in a forwarding table and a pointer table, according to an example embodiment.

Reference is now made to FIG. 2. FIG. 2 is similar to FIG. 1, but R7 is added at 110(7). R2 programs the primary path in its forwarding table 130(2) to reach R7 (16007) and marks the adjacency pointer P1 (rewrite information) as shown in the pointer table 140(2). Thus, for a primary path from R2 to R7, R2 directs the packet to R5 since the forwarding table 130(2) at R2 has R5 listed as the Next Hop (NH) for 16007.

Figure 3:
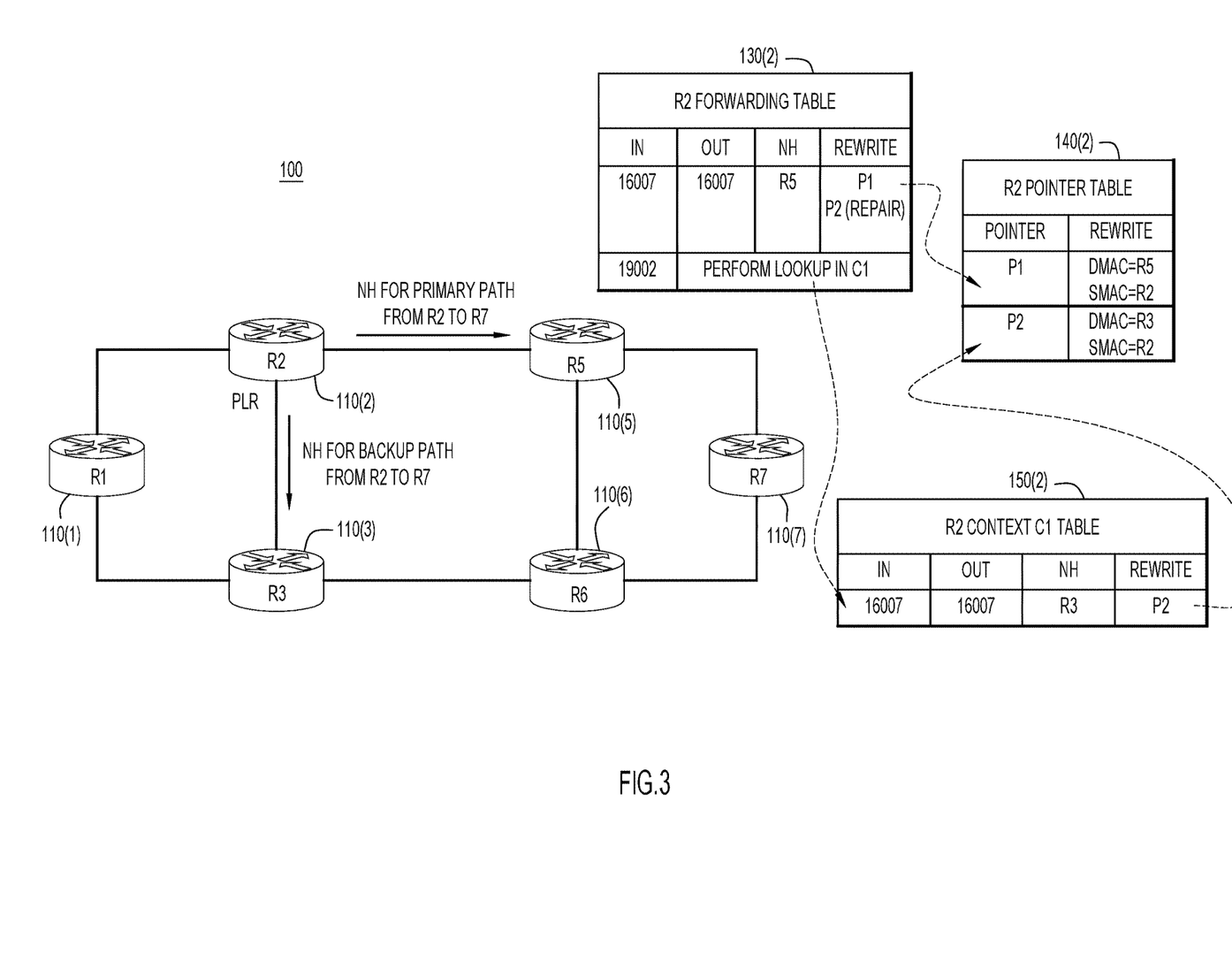
FIG. 3 is a diagram similar to FIG. 1, and showing how a particular network element assigns a context identifier that points to backup path information stored at the particular network element, according to an example embodiment.

Reference is now made to FIG. 3. R2 creates a BC-Table 150(2) and associates in the forwarding table the BC-SID to a BC-Table. The BC-SID for R2 is 19002, as described above in connection with FIG. 1. Thus, as shown in FIG. 3, the entry 19002 is added to forwarding table 130(2) with a pointer to the BC-Table 150(2). In other words, when a packet is received with a top label as the BC-SID (e.g., 19002 for R2), it will be used as a context identifier to point to the BC-Table 150(2) that is populated with the backup path information for the backup path to be validated.

Figure 4:
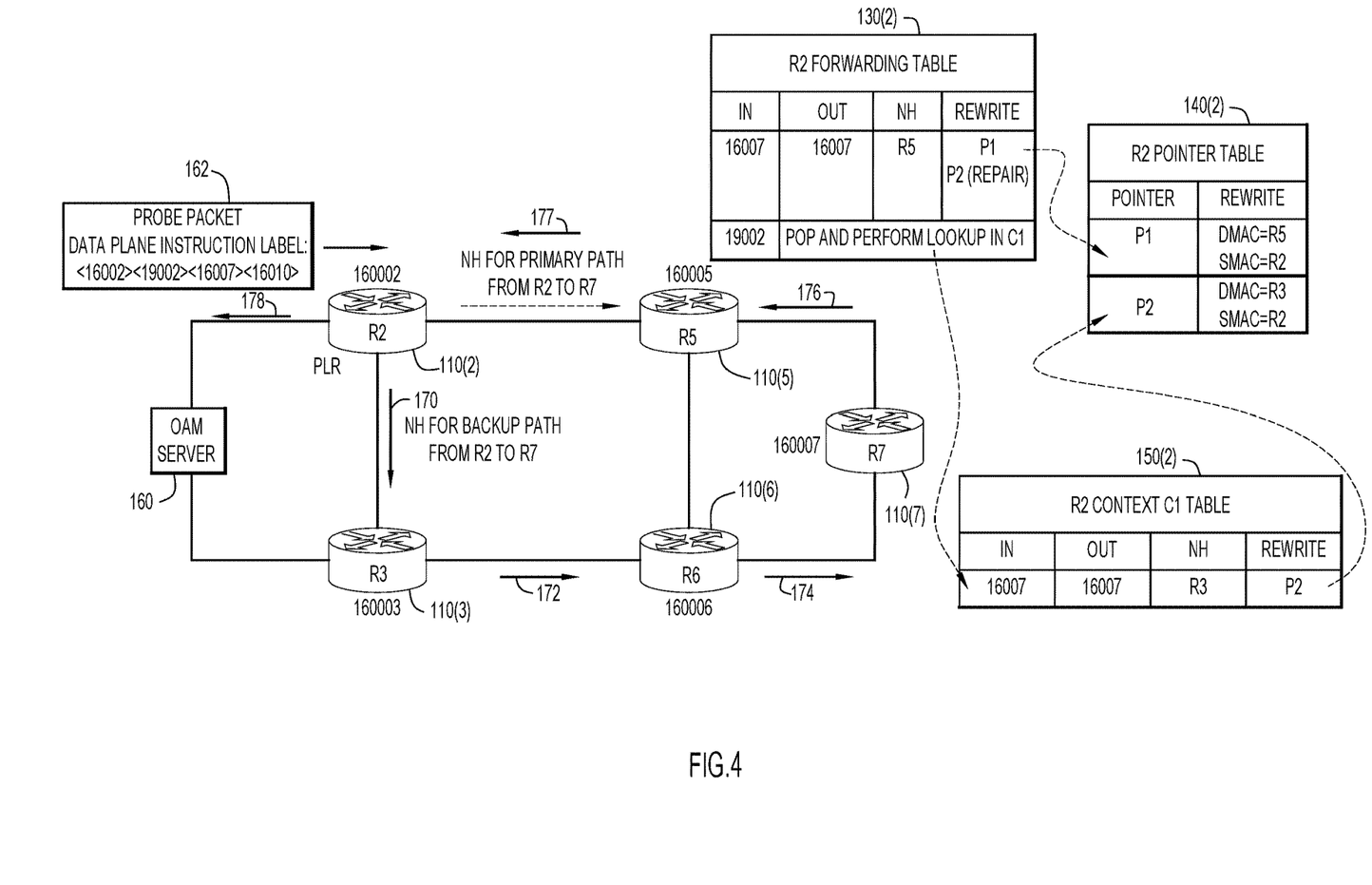
FIG. 4 is a diagram similar to FIG. 4, and showing how a probe packet is received by the particular network element and forwarded onto a backup path based on the backup path information stored at the particular network element, according to an example embodiment.

Turning now to FIG. 4, an OAM server 160 is shown. R2 computes the backup path and populates BC-Table 150(2) with the backup path. As shown in FIG. 4, R2 computes the backup path and uses the backup adjacency pointer (P2) details in BC-Table 150(2). The same pointer will be used as backup adjacency/rewrite-information pointer in primary table (which will be used in case of failure). This helps to ensure that the adjacency that is validated is the one that will be used in case of failure. As an example, the NH at R2 specified in the BC-Table 150(2) for the backup path to R7 is R3, rather than R5 which is the NH for the primary path from R2 to R7, as described above in connection with FIG. 2.

With the above setup, an OAM server 160 sends a probe packet/message 162 with the data plane instruction label <16002><19002><16007><16010> in order to validate the backup path from R2 to R7, where in this data plane instruction label the PLR is 16002, the BC-SID is 19002, the Prefix-SID is 16007 and the Server-SID is 16010. The OAM server 160 is capable of source-route packets in the network, such as by way of Segment Routing techniques.

R2, on receiving the probe packet/message, will use BC-Table 150(2) (because the top label is 19002 which is a context identifier for BC-Table 150(2)) and perform a lookup in BC-Table 150(2) for 16007. In the BC-Table 150(2), 16007 points to a backup path to R7 in which the NH is R3 to forward towards R7 as shown by arrow 170. R3 will forward the probe packet to R6 as shown by arrow 172 on route to R7 since R6 is directly connected to R7, and R6 will forward the packet to R7 as shown by arrow 174. R7 will receive the probe packet with top label as 16010 and therefore will return the probe packet back to the OAM server 160, such as by way of R5 and R2. For example, based on the Server-SID of 16010, R7 will direct the probe packet to R5 as shown at 176, R5 will forward the packet to R2 as shown at 177 and R2 will forward the packet to the OAM server 160, as shown at 178.

According to the techniques presented herein, the probe packet is returned to the OAM server after it traversed the backup path in order to allow the OAM server to validate the backup path between a PLR other nodes, without any control plane involvement on the PLR, the termination node, or any intervening nodes.

It is to be understood that the OAM server 160 may be a standalone server, a virtual router or a function running on any of the nodes. For example, the OAM server 160 may be considered as a standalone server connected to node R1 (FIG. 1).

Figure 5:
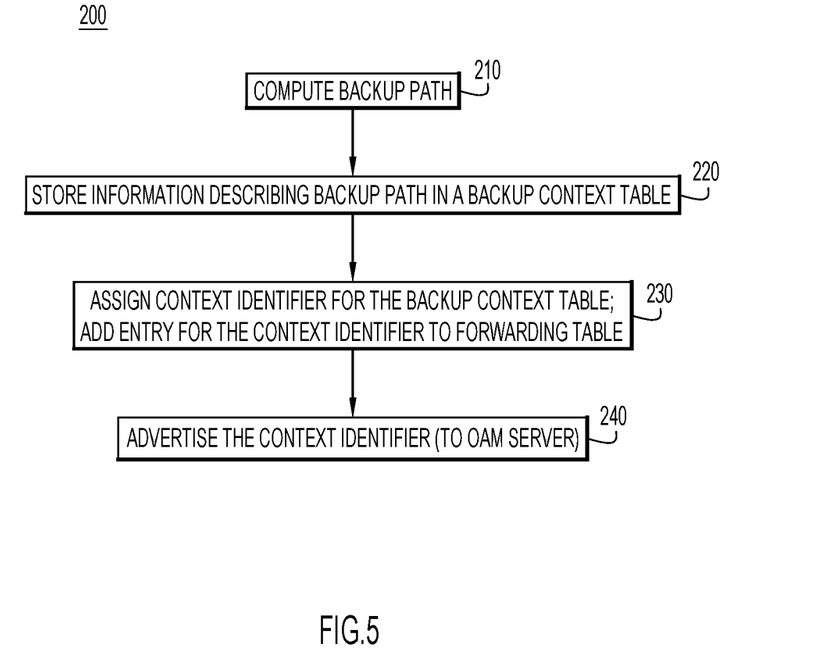
FIG. 5 is a flow chart depicting operations performed at the particular network element in advertising the context identifier to a server, according to an example embodiment.

Reference is now made to FIG. 5. FIG. 5 illustrates a flow chart of a process 200 performed at a node in connection with the techniques presented herein. The process 200 is performed when a node is to compute a backup path and advertise the availability of the backup path to an OAM server. At 210, the node computes a backup path. Numerous techniques now known or hereinafter developed may be used by a node to compute a backup path. At 220, the node stores information describing the backup path in a backup context table. For example, the node stores an identifier or address of the next hop node of the backup path. The node then assigns a context identifier for the backup path information at 230. Techniques for a node to assign a context identifier are described above. The node stores that context identifier in association with the backup path information and advertises that information to other nodes in the network, including to the OAM server. For example, as described above in connection with FIGS. 3 and 4, the node adds an entry in forwarding information (e.g., a forwarding table) for the context identifier (e.g., the BC-SID) associated with instructions to perform a lookup in a BC-Table to determine the next hop for the backup path. At 240, the node advertises the context identifier to the OAM server. A node may advertise the context identifier using techniques such as Open Shortest Path First (OSPF) or the Internal Gateway Protocol (IGP), so that the OAM server eventually becomes aware of the BC-SID to use for each node.

Figure 6:
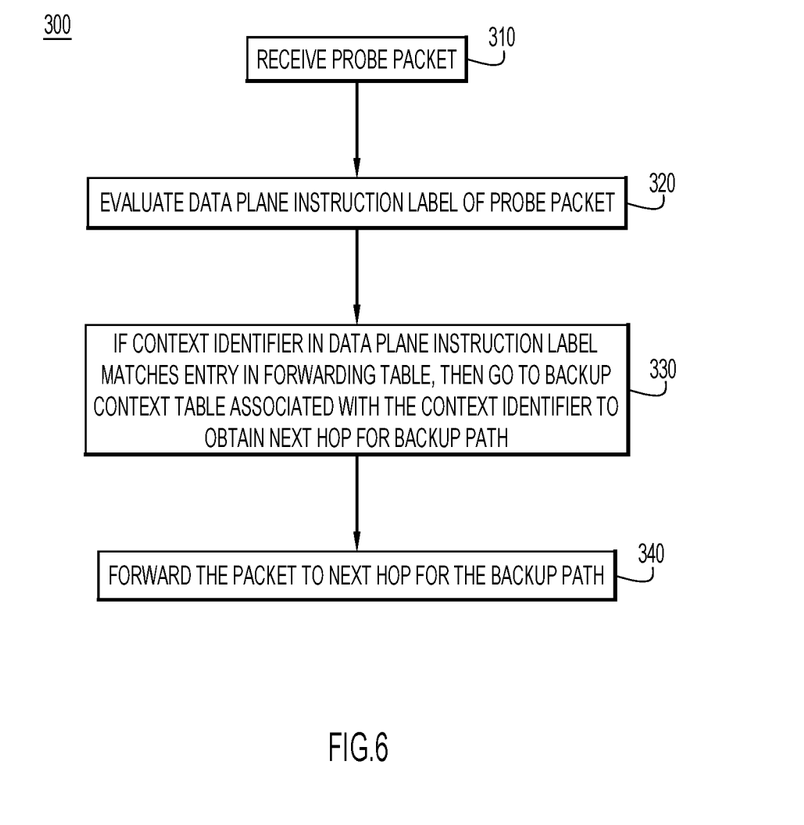
FIG. 6 is a flow chart depicting operations performed at the particular network element when receiving the probe packet from the server, according to an example embodiment.

Turning now to FIG. 6, a flow chart is shown for a process 300 performed at a node when it receives a probe packet from the OAM server. At 310, a node receives a probe packet from the OAM server. At 320, the node evaluates the data plane instruction label of the probe packet. More specifically, the node will look for a BC-SID in the data plane instruction label of the probe packet and determine whether it matches an entry in forwarding information (e.g., a forwarding table), as shown in FIG. 4.

At 330, if the context identifier in the data plane instruction label matches an entry in the forwarding information (e.g., forwarding table), then the node refers to the BC-Table to obtain the next hop for backup path. For example, in the example described above in connection with FIGS. 3 and 4, the node will find the label "19002" in the data plane instruction label of the probe packet and determine it matches an entry in the forwarding table 130(2). Then the node will refer to the BC-Table 150(2) and determine that the next hop is R3 and the data plane instruction label information (label stack) to be pushed to traverse over the backup path. At 340, the node then forwards the probe packet to the next hop node for the backup path. The label stack is needed when the next hop is not a loop-free alternate.

Figure 7:
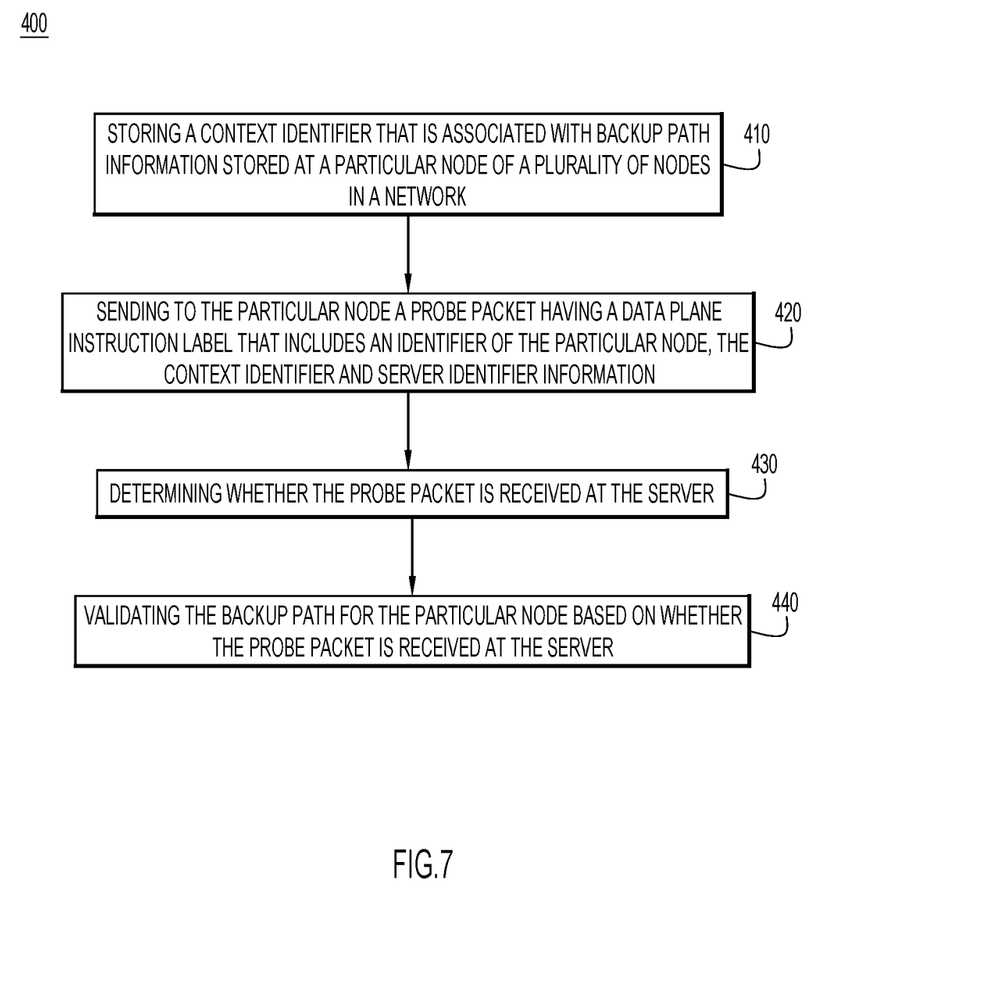
FIG. 7 is a flow chart depicting operations performed by the server to validate the backup path, according to an example embodiment.

Reference is now made to FIG. 7. FIG. 7 shows a flow chart for a process 400 performed at the OAM server. At 410, based on the advertisements the OAM server receives from one or more nodes in the network, the OAM server stores a context identifier that is associated with backup path information stored at a particular node of the plurality of nodes. The backup path information indicates a backup path in the network from the particular node. For example, the backup path information indicates the next hop and the data plane instruction label information to be pushed from the particular node in the backup path. The OAM server may perform operation 410 for multiple nodes among the plurality of nodes, for which there are backup paths computed by the respective nodes, to be validated.

At 420, the OAM server sends to the particular node a probe packet having a data plane instruction label that includes an identifier of the particular node, the context identifier and OAM server identifier information. The context identifier in the probe packet causes the particular node to retrieve the backup path information (that it has stored in a BC-Table) and send the probe packet to a next hop node and the label stack to be pushed over the backup path based on the backup path information. The probe packet will go to the next hop node as specified in the backup path information stored at the particular node, and proceed to other nodes in the network that are part of the backup path to ultimately return to the OAM server based on the server identifier information. If there is some problem with one of the nodes along the backup path, then the packet may not return to the OAM server.

At 430, the server determines whether the probe packet is received back at the OAM server. Failure of the probe packet to reach the OAM server is an indication of a failure of the backup path. Thus, at 440, the OAM server validates the backup path for the particular node based on whether the probe packet is received back at the OAM server. If the probe packet is received back at the OAM server, then the backup path is validated. If the probe packet is not received back at the OAM server, then the backup path is not validated.

Figure 8:
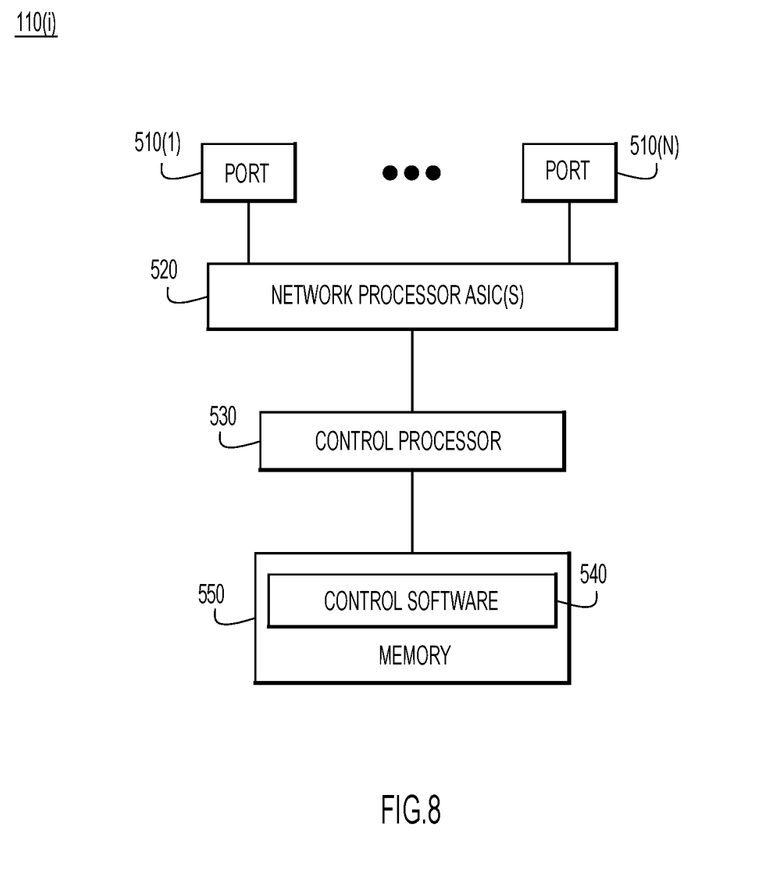
FIG. 8 is a block diagram of a network element configured to perform the operations described herein as part of the data plane-based backup path validation techniques, according to an example embodiment.

Turning now to FIG. 8, a block diagram of a node is shown. This diagram is meant to representative of any of the network elements/nodes shown in FIGS. 1-4, and is thus given the reference numeral 110($i$). A node includes a plurality of ports 510(1)-510(N) at which packets may be received at a given node and from which packets may be sent from a given node. A network processor Application Specific Integrated Circuit (ASIC) 520 or multiple such ASICs is provided to perform the network processing functions (e.g., routing/forwarding, etc.) with respect to packets received at a given one of the ports 510(1)-510(N). A control processor 530 (or multiple such control processors) provides higher level control of the node based on control software 540 stored in memory 550.

The memory 550 may be read only memory (ROM), random access memory (RAM), magnetic disk storage media devices, optical storage media devices, flash memory devices, electrical, optical, or other physical/tangible memory storage devices. Thus, in general, the memory 550 may comprise one or more tangible (non-transitory) computer readable storage media (e.g., a memory device) encoded with computer executable instructions of the control software 540 and when the control software 540 is executed (by the control processor 530) it is operable to perform the operations described above in connection with FIGS. 1-6 of a node. In another form, the operations of the nodes described herein are performed on the basis of configurations made to the network processor ASIC 520, or based on functions performed by a combination of the network processor ASIC 520 and the control software 540.

Figure 9:
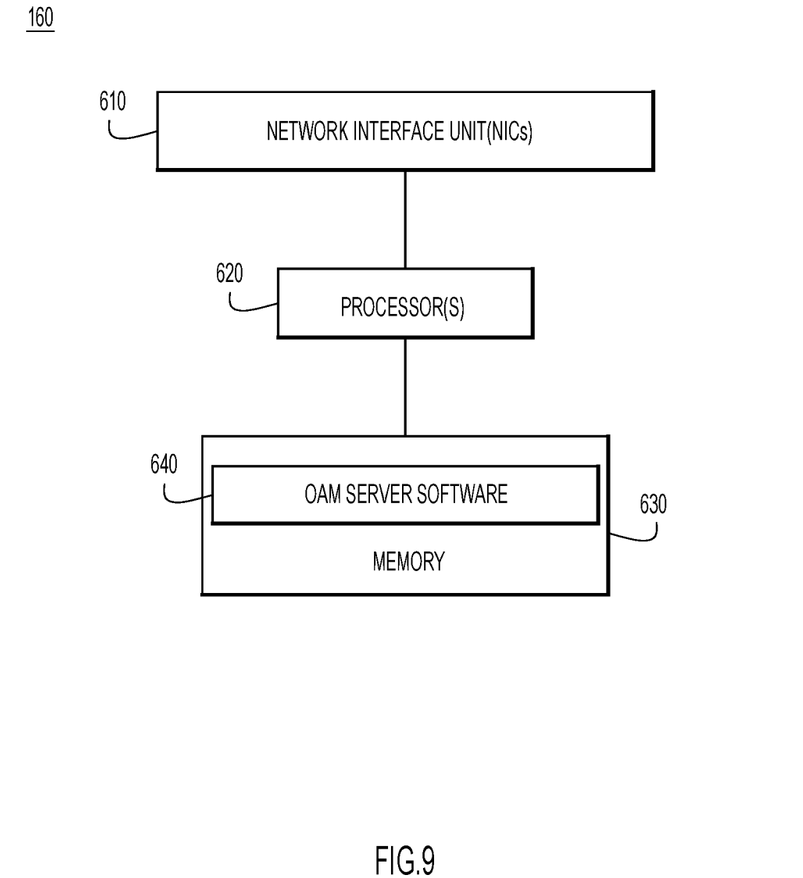
FIG. 9 is a block diagram of a server configured to perform the operations described herein as part of the data plane-based backup path validation techniques, according to an example embodiment.

Reference is now made to FIG. 9. FIG. 9 shows a block diagram of the OAM server 160. In one form, the OAM server 160 includes a network interface unit 610 that may take the form of one or more network interface cards (NICs). The network interface unit 610 enables network communications so that the OAM server can communicate with the nodes, as depicted in FIGS. 1-4. The OAM server 160 also includes one or more processors 620 coupled to the network interface unit 610. A memory 630 is coupled to the processor(s) 620 and the memory 630 stores computer executable instructions for OAM server software 640. The processor(s) 620 executes the OAM server software 630 to perform the operations described above in connection with FIGS. 1-7 on behalf of the OAM server 160.

In summary, a domain wide unique label is assigned (e.g., from a SRGB) as a context identifier on all nodes. When any node computes the backup path for link/node protection, it creates a Backup Context table (BC-Table) and populates the backup entries in this new context table. The BC-SID will be used as context identifier to identify this table. The primary path entry is marked with primary adjacency and the backup adjacency (in case of primary link failure) points towards the context identifier (BC-SID). When any node receives a packet with a top segment as the BC-SID, it will perform a lookup in its BC-Table. These techniques enable validation of a backup path without control plane intervention.

The techniques presented herein are not limited to Segment Routing. They could be used in any MPLS network. The term "data plane instruction label" is meant to be generic and not limited to MPLS. In general, a data plane instruction label includes labels in a label stack, segment list in a Segment Routing header (as used in Segment Routing version 6 (SRv6), or any data plane routing instructions scheme now known or hereinafter developed. In addition, these techniques may be used with targeted Label Distribution Protocol (LDP) networking.

In summary, in one form, a method is provided that is performed by a server, e.g., an OAM server, that has connectivity to a network that includes a plurality of nodes. The method involves: storing a context identifier that is associated with backup path information stored at a particular node of the plurality of nodes, the backup path information indicating a backup path in the network from the particular node; sending to the particular node a probe packet having a data plane instruction label that includes an identifier of the particular node, the context identifier and server identifier information, the context identifier in the probe packet causing the particular node to retrieve the backup path information and send the probe packet to a next hop node in the backup path based on the backup path information; determining whether the probe packet is received at the server after traversing the backup path; and validating the backup path for the particular node based on whether the probe packet is received at the server.

This method further includes receiving from the particular node an advertisement indicating the context identifier for the backup path information.

In one embodiment, the plurality of nodes are configured to perform Segment Routing based networking, and the identifier of the particular node is a segment identifier, the context identifier is a backup context segment identifier advertised by the particular node to the server, and the server identifier information is a server segment identifier for the segment to reach the server in the network. The data plane instruction label may further include a prefix segment identifier for which the backup path is to be validated.

In one embodiment, the particular node is a Point of Local Repair (PLR) in the network. Moreover, the context identifier may be a domain wide unique label that is assigned from a Segment Routing Global Block (SRGB).

To generalize, however, the plurality of nodes are configured to perform any type of label-based routing of packets.

In another form, a method is provided that is performed by a node in a network that includes a plurality of nodes. The method includes: computing a backup path in the network; storing backup path information describing the backup path in a backup context table; assigning a context identifier for the backup context table; adding an entry for the context identifier to forwarding information maintained at the node; and advertising the context identifier in the network, including to a server that manages the plurality of nodes in the network. Again, in one embodiment, the wherein the context identifier is a domain wide unique label that is assigned from a Segment Routing Global Block (SRGB).

This method may further include: receiving a probe packet from the server, the probe packet having a data plane instruction label that includes an identifier of the particular node, the context identifier and server identifier information; based on the context identifier in the probe packet, retrieving the backup path information; and sending the probe packet to a next hop node in the backup path based on the backup path information. Moreover, a further step may be provided for determining from the backup path information the next hope node and data plane instruction label information to be pushed to traverse over the backup path.

Again, the plurality of nodes are configured to perform Segment Routing based networking, and wherein the identifier of the particular node is a segment identifier, the context identifier is a backup context segment identifier advertised by the particular node to the server, and the server identifier information is a server segment identifier for the segment to reach the server. The data plane instruction label may further include a prefix segment identifier for which the backup path is to be validated.

In still another form, an apparatus (e.g., an OAM server) is provided comprising: a network interface unit configured to enable connectivity over a network that includes a plurality of nodes; a memory; and a processor coupled to the network interface unit and to the memory. The processor is configured to: store a context identifier that is associated with backup path information stored at a particular node of the plurality of nodes, the backup path information indicating a backup path in the network from the particular node; send to the particular node a probe packet having a data plane instruction label that includes an identifier of the particular node, the context identifier and server identifier information, the context identifier in the probe packet causing the particular node to retrieve the backup path information and send the probe packet to a next hop node in the backup path based on the backup path information; determine whether the probe packet is received at the server after traversing the backup path; and validate the backup path for the particular node based on whether the probe packet is received at the apparatus.

In still another form, one or more non-transitory computer readable storage media are provided, encoded with instructions that, when executed by a processor (or multiple processors), cause the processor to perform operations at a server (e.g., an OAM server) including: storing a context identifier that is associated with backup path information stored at a particular node of the plurality of nodes, the backup path information indicating a backup path in the network from the particular node; sending to the particular node a probe packet having a data plane instruction label that includes an identifier of the particular node, the context identifier and server identifier information, the context identifier in the probe packet causing the particular node to retrieve the backup path information and send the probe packet to a next hop node in the backup path based on the backup path information; determining whether the probe packet is received at the server after traversing the backup path; and validating the backup path for the particular node based on whether the probe packet is received at the server.

In still a further embodiment, one or more non-transitory computer readable storage media are provided, encoded with instructions that, when executed by a processor (or multiple processors), cause the processor to perform operations at a node in a network that includes a plurality of nodes, including: computing a backup path in the network; storing backup path information describing the backup path in a backup context table; assigning a context identifier for the backup context table; adding an entry for the context identifier to forwarding information maintained at the node; and advertising the context identifier in the network, including to a server that manages the plurality of nodes in the network.

In still another form, an apparatus (e.g., a node) is provided comprising: a plurality of ports at which to receive packets and send packets into a network that includes a plurality of nodes; a network processor unit; and a control processor. The control processor is configured to: compute a backup path in the network; store backup path information describing the backup path in a backup context table; assign a context identifier for the backup context table; add an entry for the context identifier to forwarding information maintained at the node; and advertise the context identifier in the network, including to a server that manages the plurality of nodes in the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server that has connectivity to a network that includes a plurality of nodes:
      storing a context identifier that is associated with a pointer to a backup context table stored at a particular node of the plurality of nodes, wherein the backup context table includes a pointer to a pointer table that includes an entry for rewriting a destination media access control address of a probe packet as a media access control address of a next hop node in a backup path for a primary path in the network from the particular node, the backup context table indicating the backup path;
      sending, to the particular node, the probe packet, wherein the probe packet includes a data plane instruction label that includes an identifier of the particular node, the context identifier and server identifier information, the context identifier in the probe packet causing the particular node to perform, based on the pointer to the backup context table, a lookup in the backup context table for the pointer to the pointer table, and send the probe packet to the next hop node in the backup path based on the entry for rewriting the destination media access control address;

determining whether the probe packet is received at the server in reverse of the primary path after traversing the backup path; and validating the backup path for the particular node based on whether the probe packet is received at the server in reverse of the primary path.

2. The method of claim 1, further comprising receiving, from the particular node, an advertisement indicating the context identifier.

3. The method of claim 1, wherein the plurality of nodes includes a plurality of Segment Routing nodes, and wherein the identifier of the particular node is a segment identifier, the context identifier is a backup context segment identifier advertised by the particular node to the server, and the server identifier information is a server segment identifier to reach the server in the network.

4. The method of claim 3, wherein the data plane instruction label further includes a prefix segment identifier for which the backup path is to be validated.

5. The method of claim 3, wherein the particular node is a Point of Local Repair (PLR) in the network.

6. The method of claim 3, wherein the context identifier is a domain wide unique label that is assigned from a Segment Routing Global Block (SRGB).

7. The method of claim 1, wherein the plurality of nodes includes a plurality of label-based routing nodes.

8. A method comprising:
at a node in a network that includes a plurality of nodes:
computing a backup path for a primary path in the network;
storing backup path information describing the backup path in a backup context table that includes a pointer to a pointer table;
assigning a context identifier that is associated with a pointer to the backup context table;
adding an entry for the context identifier to forwarding information maintained at the node and an entry for rewriting a destination media access control address of a probe packet as a media access control address of a next hop node in the backup path to the pointer table;
advertising the context identifier in the network, including to a server that manages the plurality of nodes in the network;
receiving the probe packet from the server, the probe packet having a data plane instruction label that includes an identifier of the node, the context identifier and server identifier information;
based on the context identifier in the probe packet and the pointer to the backup context table, performing a lookup in the backup context table for the pointer to the pointer table;
sending the probe packet to the next hop node in the backup path based on the entry for rewriting the destination media access control address; and
receiving the probe packet in reverse of the primary path after traversing the backup path.

9. The method of claim 8, wherein the context identifier is a domain wide unique label that is assigned from a Segment Routing Global Block (SRGB).

10. The method of claim 8, further comprising determining from the backup path information the next hop node and data plane instruction label information to be pushed to traverse over the backup path.

11. The method of claim 8, wherein the plurality of nodes are configured to perform Segment Routing based networking, and wherein the identifier of the node is a segment identifier, the context identifier is a backup context segment identifier advertised by the node to the server, and the server identifier information is a server segment identifier to reach the server.

12. The method of claim 11, wherein the data plane instruction label further includes a prefix segment identifier for which the backup path is to be validated.

13. An apparatus comprising:
a network interface unit configured to enable connectivity over a network that includes a plurality of nodes;
a memory; and
a processor coupled to the network interface unit and to the memory, wherein the processor is configured to:
store a context identifier that is associated with a pointer to a backup context table stored at a particular node of the plurality of nodes, wherein the backup context table includes a pointer to a pointer table that includes an entry for rewriting a destination media access control address of a probe packet as a media access control address of a next hop node in a backup path for a primary path in the network from the particular node, the backup context table indicating the backup path;
send, to the particular node, the probe packet, wherein the probe packet includes a data plane instruction label that includes an identifier of the particular node, the context identifier and server identifier information, the context identifier in the probe packet causing the particular node to perform, based on the pointer to the backup context table, a lookup in the backup context table for the pointer to the pointer table, and send the probe packet to the next hop node in the backup path based on the entry for rewriting the destination media access control address;
determine whether the probe packet is received at the apparatus in reverse of the primary path after traversing the backup path; and
validate the backup path for the particular node based on whether the probe packet is received at the apparatus in reverse of the primary path.

14. The apparatus of claim 13, wherein the processor is configured to receive from the particular node, via the network interface unit, an advertisement indicating the context identifier.

15. The apparatus of claim 13, wherein the plurality of nodes includes a plurality of Segment Routing nodes, and wherein the identifier of the particular node is a segment identifier, the context identifier is a backup context segment identifier advertised by the particular node to the apparatus, and the server identifier information is a server segment identifier to reach the apparatus in the network.

16. The apparatus of claim 15, wherein the data plane instruction label further includes a prefix segment identifier for which the backup path is to be validated.

17. The apparatus of claim 15, wherein the particular node is a Point of Local Repair (PLR) in the network.

18. The apparatus of claim 15, wherein the context identifier is a domain wide unique label that is assigned from a Segment Routing Global Block (SRGB).

19. The apparatus of claim 13, wherein the apparatus is configured to perform any type of label-based routing of packets, and wherein the plurality of nodes includes a plurality of label-based routing nodes.

20. The method of claim 8, further comprising:
in response to receiving the probe packet in reverse of the primary path after traversing the backup path, sending the probe packet to the server.

* * * * *